United States Patent
Proksa et al.

Patent Number: 5,453,249
Date of Patent: * Sep. 26, 1995

[54] APPARATUS FOR PRODUCING A FLOWABLE REACTION MIXTURE FROM AT LEAST TWO FLOWABLE REACTION COMPONENTS

[75] Inventors: Ferdinand Proksa, Leverkusen; Hans-Michael Sulzbach; Helmuth Duschanek, both of Königswinter; Althausen, Neunkirchen; Jürgen Wirth, Köln; Reiner Raffel, Siegburg, all of Germany

[73] Assignee: Maschinenfabrik Hennecke GmbH, Leverkusen, Germany

[*] Notice: The portion of the term of this patent subsequent to Aug. 22, 2012 has been disclaimed.

[21] Appl. No.: 38,409

[22] Filed: Mar. 29, 1993

[30] Foreign Application Priority Data

Apr. 6, 1992 [DE] Germany .............. 42 11 458.6

[51] Int. Cl.[6] .............. C08F 2/00; B67D 5/60; G05D 11/02; B01F 15/02
[52] U.S. Cl. .............. 422/133; 422/134; 425/200; 425/207; 222/136; 222/149; 222/145.2; 366/159.1; 366/162.5
[58] Field of Search .............. 422/131, 132, 422/133, 134; 425/200, 207; 222/136, 137, 145, 149; 366/152, 177

[56] References Cited

U.S. PATENT DOCUMENTS

| | | | |
|---|---|---|---|
| 3,975,128 | 8/1976 | Schlüter | 425/207 |
| 4,141,470 | 2/1979 | Schulte et al. | 222/137 |
| 4,397,407 | 8/1983 | Skoupi et al. | 222/132 |
| 4,802,770 | 2/1989 | Fiorentini | 366/177 |
| 5,143,946 | 9/1992 | Proksa et al. | 521/155 |

FOREIGN PATENT DOCUMENTS 070486  1/1983  European Pat. Off. .

*Primary Examiner*—Robert J. Warden
*Assistant Examiner*—Christopher Y. Kim
*Attorney, Agent, or Firm*—Joseph C. Gil

[57] ABSTRACT

In the production of a flowable reaction mixture of at least two flowable, also not readily miscible, reaction components which react completely with each other to form solid substance or foam material, a rapid abatement of the mixture flow is achieved with a compact type of construction after causing throttling at the discharge of the mixing chamber.

4 Claims, 2 Drawing Sheets

APPARATUS FOR PRODUCING A FLOWABLE REACTION MIXTURE FROM AT LEAST TWO FLOWABLE REACTION COMPONENTS

BACKGROUND OF THE INVENTION

The invention relates to a device for producing a flowable reaction mixture of at least two flowable reaction components which react completely with each other to form solid substances or foam materials. Devices for producing flowable reaction mixtures are known in the art and generally comprise storage vessels, from which feed pipes lead via dosing pumps to a mixing head which contains a mixing chamber with ejector piston guided therein, into which mixing chamber feed pipes lead by means of injection nozzles, and a throttle slide arranged transversely to the mixing chamber in a guide bore, and also a discharge channel with cleaning piston. One such device is described in published European patent application 70,486.

A mixhead for preparing such flowable mixtures is also described in German Patent 2,327,269 (U.S. Pat. No. 3,975,128) and U.S. Pat. No. 3,975,128. In the mixhead described therein, immediately following the mixing chamber there is positioned at right angles a discharge channel which is intended to calm the reaction mixture and which can be cleaned by the corresponding ejector piston. In practice, attempts have also been made to use this ejector piston for the purpose of throttling the flow of reaction mixture issuing from the mixing chamber. In the case of reaction components which are not readily miscible, the throttling action needs to be of such strength that it is not possible to calm the flow of mixture sufficiently before it enters the mold cavity. This results in the reaction mixture spraying out of the discharge aperture of the discharge channel and not forming a closed flow front.

Another well-known mixing head (German Patent 2,612,812 (U.S. Pat. No. 4,141,470) and U.S. Pat. No. 4,141,470) has a transverse slide between the mixing chamber and discharge pipe by way of a throttling device, said transverse slide being provided with a through-flow aperture. By displacing this throttling device, it is possible to adjust the desired through-flow cross-section. For the purpose of cleaning the mixing chamber and the discharge pipe, the throttle slide is placed in the cleaning position so that the ejector piston can pass through the flow aperture. This mixing head has a relatively large overall length. A problem in this connection is the precise control of throttling device and ejector piston so as to ensure that these two elements do not collide. Also unfavorable is the large resulting overall length of the ejector piston, since in this connection there is a danger that a film of mixture remaining between ejector piston and the wall of the mixing chamber and discharge pipe may cause the ejector piston to adhere to this wall, which could cause the piston to become blocked. In order to prevent this, an inordinately large propulsive power has to be provided for the ejector piston. Because of the danger of the ejector piston breaking, it must have a certain minimum diameter for its length. For this reason the cross-sections of mixing chamber and discharge pipe cannot be arbitrarily small. A further disadvantage is that the cross-section of the mixing chamber and the cross-section of the discharge pipe must be correspondent to each each other.

Although the device according to published European patent application 70,486 does not exhibit the processing disadvantages of the aforementioned mixheads, it is however very costly to construct and is of unwieldy size.

In order to improve still further the rapid abatement of the mixture flow after throttling and to ensure that a device which is less costly to build and which is of small dimensions, is not susceptible to faults, is safe to operate and is capable of cleaning itself, even in the case of processing reaction components which are not readily miscible, it has been proposed according to published European patent application 498,227 (U.S. Pat. No. 5,143,946) to arrange the throttle slide in the guide bore concentrically with regard to the cleaning piston, whereby the guide bore protrudes in the direction of flow of the mixture beyond the discharge of the mixing chamber and in the mixing phase forms a ring channel with the front end of the cleaning piston, said ring channel passing into the discharge channel. In this way it has been possible to arrive at a device in which the mixture flow issuing from the throttle gap formed between the mixing-chamber discharge and the throttle slide cannot enter the discharge channel directly but first reaches a ring channel formed by the wall of the guide bore of the throttle slide externally and the cleaning piston which projects beyond the throttle slide. From this ring channel the reaction mixture then flows between the junction edge formed by the guide bore and discharge channel with the front edge of the cleaning piston as a downward flow, whereby the discharge channel forms the sink. As a result of the concentric arrangement of throttle slide and cleaning piston, this device is of very compact design; collisions of the pistons and the throttle slide are not possible. Surprisingly, no material accumulates at the ring-shaped shoulder at the interface between guide bore and discharge channel, since mixture residues are completely pushed away by the thrusting of the throttle slide. It has been shown with this device, however, that if the throttle slide and the ejector piston are unfavorably positioned, the desired laminar sinking flow does not set in or only sets in approximately, since the throttled jet can spurt directly out of the mixing chamber into the discharge channel.

It is the object of the present invention to improve the device described in published European patent application 498,227 (U.S. Pat. No. 5,143,946) in such a way that the desired laminar sinking flow develops also in the case of extreme throttling.

DESCRIPTION OF THE INVENTION

The above object is achieved in such a manner that the front face of the throttle slide and the corresponding opposite face running parallel to it, which, proceeding from the mixing chamber, forms a shoulder with regard to the discharge channel, are inclined at the same angle to the center axis of the throttle slide in the direction of flow. In this way the ring channel is extended along its side that faces away from the mixing chamber. This makes it possible to seal the ring channel with the cleaning piston on the side facing the mixing chamber, so that even in the case of extreme throttling the jet of mixture cannot spurt directly out of the mixing chamber into the discharge channel. The fact that the sinking flow only develops in a partial zone has not proved to be a disadvantage in practice.

More particularly, the present invention is directed to a device comprising:

a) storage vessels, from which feed pipes lead via dosing pumps to b) a mixing head which contains a mixing chamber and an ejector piston guided therein, into which mixing chamber feed pipes lead by means of injection nozzles and from which mixing chamber the reaction mixture discharge, c) a throttle slide arranged transversely to said mixing chamber in a guide bore, d) a discharge channel having a cleaning piston associated therewith, e) said throttle slide being arranged concentrically in said guide bore around said cleaning piston, f) said guide bore projecting in the direction of flow of the mixture beyond the discharge of said mixing chamber, wherein said guide bore, in the mixing phase, forms a ring channel with the front end of said cleaning piston, said ring channel passing into said discharge channel, g) the front face of said throttle slide and the corresponding opposite face of said discharge channel running parallel to each other and forming a shoulder, with said shoulder inclined downwardly away from said mixing chamber, and with both of said faces inclined at the same angle to the center axis of said throttle slide.

According to one particular embodiment, the front face of the throttle slide and the opposite face are preferably inclined at a constant angle. This is particularly favorable from the point of view of manufacture. The angle preferably lies between 50° and 80°. In this range, the flow is particularly favorable.

According to another particular embodiment, the front face of the throttle slide and the opposite face exhibit a contour adapted to special processing requirements. Such a contour can, for example, be advantageous with certain viscosities of the reaction mixture. In this way the formation of the flow or the way it is directed can be influenced further. The contour is present in the cross-section of the front face, but may however change additionally according to the area of the front face and the opposite face, but, in any case, changes symmetrically.

Figure 1:
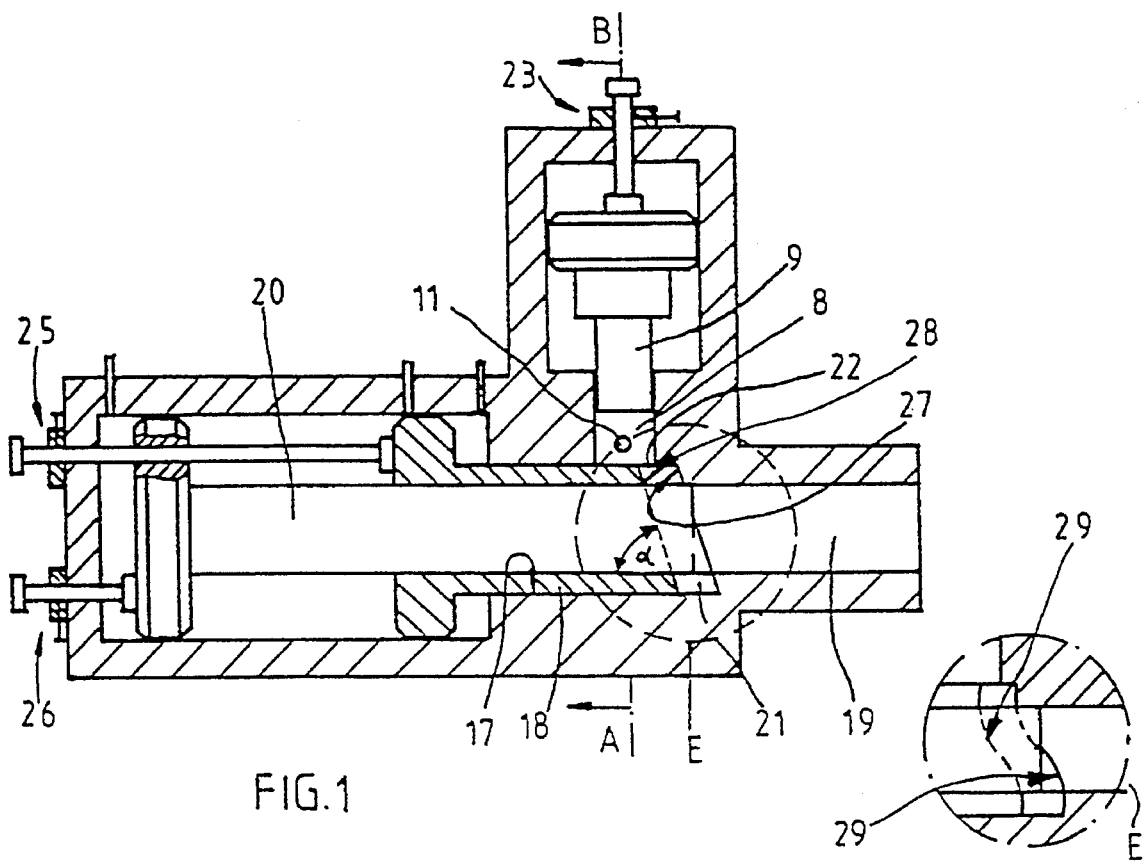
FIG. 1 is a longitudinal section through the device of the present invention in the operating position.
Figure 2:
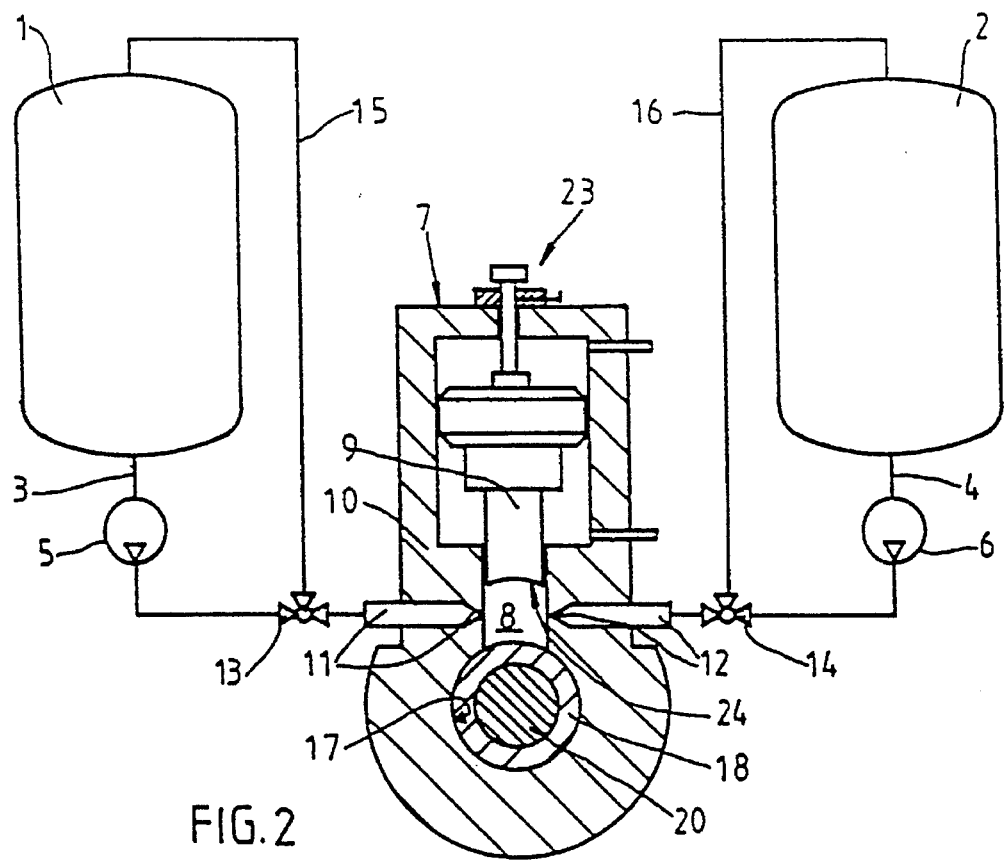
FIG. 2 is a sectional view through line A-B of FIG. 1.
Figure 3:
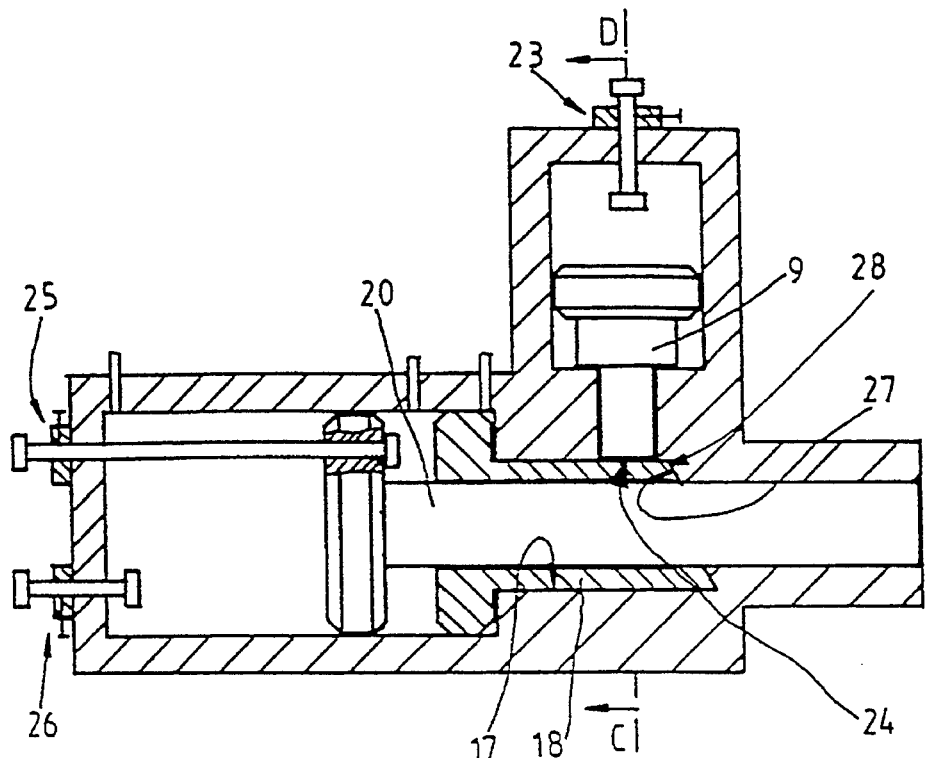
FIG. 3 is a longitudinal section through the device in rest position and FIG. 4 is a a sectional view through line C-D of FIG. 3.
Figure 4:
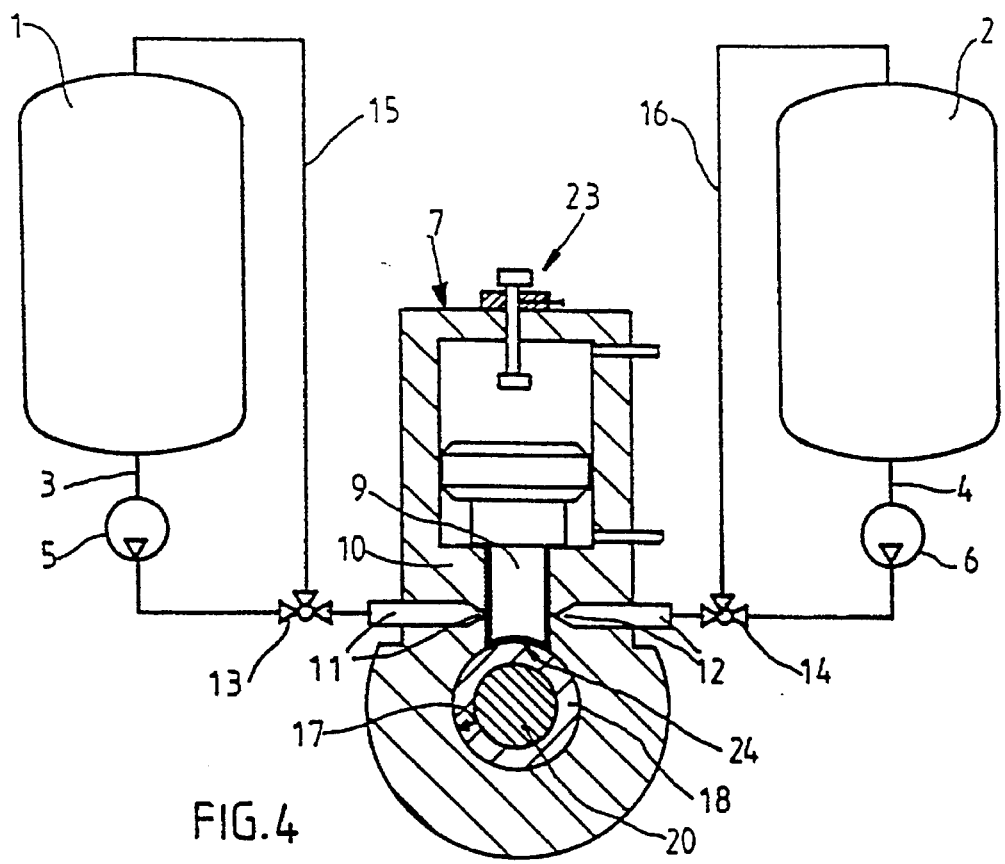

One embodiment of the device according to the invention is represented purely schematically in the drawings, wherein the mixhead itself is reproduced in detail but the accessory units are only shown symbolically. From storage vessels 1, 2 for polyol or isocyanate, feed pipes 3, 4 lead via dosing pumps 5, 6 to a mixhead 7. Arranged in the mixhead is a mixing chamber 8 in which an ejector piston 9 is guided. In housing 10 of mixhead 7 there are injection nozzles 11, 12, via which feed pipes 3, 4 lead into mixing chamber 8. Multi-way valves 13, 14 enable the reaction components to be returned via recycle pipes 15, 16 to storage vessels 1, 2. Placed downstream of and transverse to mixing chamber 8 is a guide bore 17 for a throttle slide 18. The throttle slide has a front face 28 inclined at an angle α of, for example, 64°, to the center axis and surrounds concentrically a cleaning piston 20 guided in a discharge channel 19. Since guide bore 17 has a greater diameter than discharge channel 19 or cleaning piston 20, a ring channel 21 is present (FIG. 1) into which leads discharge 22 of mixing chamber 8, said discharge being formed by the throttle gap (FIG. 1). Corresponding to ejector piston 9 is an adjusting device 23 which consists of an adjustable stop, with the aid of which the rear dead-center position can be selected. By appropriate design the front dead-center position can be adjusted in such a way that front face 24 of ejector piston 9 is aligned with the wall of guide bore 17 and lies closely therewith against throttle slide 18 (FIGS. 3, 4). Throttle slide 18 and cleaning piston 20 are equipped with adjusting devices 25 and 26 respectively consisting of fixable stops for the rear dead-center positions. The front dead-center position of throttle slide 18 is formed by shoulder 27 at the junction of guide bore 17 with discharge channel 19. This shoulder 27 is the opposite face to front face 28 of throttle slide 18 and is inclined at the same angle α, i.e., for example of 64°. The front dead-center position of cleaning piston 20 corresponds to the end of discharge channel 19.

From detail E in FIG. 1 it can be seen that both the front face 28 of throttle slide 18 and the opposite parallel face formed as shoulder 27 alternatively exhibit a curved contour 29.

Proceeding from the position of the pistons and the throttle slide in accordance with FIGS. 3 and 4, the mode of operation will now be described. Multi-way valves 13 and 14 are switched to recirculation. Cleaning piston 20, throttle slide 18 and ejector piston 9 are moved to their rear dead-center positions, whereby it is assumed that these dead-center positions have previously been adjusted as desired by means of adjusting devices 23, 25 and 26. Now multi-way valves 13 and 14 are switched over and the reaction components flow through flow nozzles 11 and 12 into mixing chamber 8, undergo turbulent mixing there and reach ring channel 21 through discharge 22 formed as the throttle gap. The mixture flow is thereby split up and flows around the end of cleaning piston 20 protruding beyond throttle slide 18 and flows down as sinking flow into discharge channel 19. When the necessary amount of mixture has passed through, multi-way valves 13 and 14 switch over to recirculation. Ejector piston 9 moves to the front dead-center position, thereby emptying mixing chamber 8 and filling it completely. Then throttle slide 18 moves to its front dead-center position and displaces the reaction mixture from ring channel 21 and fills it completely. Finally discharge channel 19 is emptied with the aid of cleaning piston 20 as it moves to its front dead-center position.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A device for producing a flowable reaction mixture of at least two flowable reaction components which react with each other to form solid or foam material, comprising a) storage vessels, from which feed pipes lead via dosing pumps to b) a mixing head which contains a mixing chamber and an ejector piston guided therein, into which said mixing chamber said feed pipes lead by means of injection nozzles and from which mixing chamber the reaction mixture discharge, c) a throttle slide arranged transversely to said mixing chamber in a guide bore, d) a discharge channel having a cleaning piston associated therewith, e) said throttle slide being arranged concentrically in said guide bore around said cleaning piston, f) said guide bore projecting in the direction of flow of the mixture beyond the discharge of said mixing chamber, wherein said guide bore, in the mixing phase, forms a ring channel with the front end of said cleaning piston, said ring channel passing into said discharge channel, g) the front face of said throttle slide and the corresponding opposite face of said discharge channel running parallel to each other and forming a shoulder, with said shoulder inclined downwardly away from said mixing chamber, and with both of said faces inclined at the same angle to the center axis of said throttle slide.

2. The device of claim 1, wherein both of said faces are inclined at a constant angle.

3. The device of claim 2, wherein said angle lies between 50° and 80°.

4. The device of claim 1, wherein both of said faces are contoured.

* * * * *